United States Patent
Strauss et al.

(10) Patent No.: US 8,151,075 B2
(45) Date of Patent: Apr. 3, 2012

(54) MULTIPLE ACCESS TYPE MEMORY AND METHOD OF OPERATION

(75) Inventors: Timothy J. Strauss, Austin, TX (US); David W. Chrudimsky, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 282 days.

(21) Appl. No.: 12/692,125

(22) Filed: Jan. 22, 2010

(65) Prior Publication Data

US 2011/0185146 A1 Jul. 28, 2011

(51) Int. Cl.
*G06F 12/00* (2006.01)

(52) U.S. Cl. . 711/169; 711/204; 711/213; 711/E12.004; 711/E12.057

(58) Field of Classification Search .................. None
See application file for complete search history.

(56) References Cited

U.S. PATENT DOCUMENTS

| | | | | |
|---|---|---|---|---|
| 5,107,465 A | * | 4/1992 | Fung et al. | 365/230.08 |
| 5,384,737 A | * | 1/1995 | Childs et al. | 365/189.05 |
| 6,493,818 B2 | * | 12/2002 | Robertson | 712/27 |
| 6,920,540 B2 | * | 7/2005 | Hampel et al. | 711/167 |
| 7,099,233 B2 | | 8/2006 | Chen | |
| 7,143,302 B2 | * | 11/2006 | Pappalardo et al. | 713/500 |
| 7,177,985 B1 | * | 2/2007 | Diefendorff | 711/137 |
| 7,254,690 B2 | | 8/2007 | Rao | |
| 7,394,288 B1 | | 7/2008 | Agarwal | |
| 7,401,179 B2 | * | 7/2008 | Loffler | 711/104 |
| 2006/0168417 A1 | * | 7/2006 | Loffler | 711/167 |
| 2009/0055595 A1 | * | 2/2009 | Gill et al. | 711/137 |
| 2010/0228835 A1 | * | 9/2010 | Pitts | 709/219 |

* cited by examiner

*Primary Examiner* — Edward J Dudek
*Assistant Examiner* — Ralph A Verderamo, III
(74) *Attorney, Agent, or Firm* — Rob King; Charles Bergere

(57) ABSTRACT

A method for accessing a memory includes receiving a first address wherein the first address corresponds to a demand fetch, receiving a second address wherein the second address corresponds to a speculative prefetch, providing first data from the memory in response to the demand fetch in which the first data is accessed asynchronous to a system clock, and providing second data from the memory in response to the speculative prefetch in which the second data is accessed synchronous to the system clock. The memory may include a plurality of pipeline stages in which providing the first data in response to the demand fetch is performed such that each pipeline stage is self-timed independent of the system clock and providing the second data in response to the speculative prefetch is performed such that each pipeline stage is timed based on the system clock to be synchronous with the system clock.

14 Claims, 4 Drawing Sheets

MULTIPLE ACCESS TYPE MEMORY AND METHOD OF OPERATION

BACKGROUND

1. Field

This disclosure relates generally to semiconductors, and more specifically, to pipelined memory circuits.

2. Related Art

Various memory circuits are implemented in pipelined stages that are a sequence of functional stages for performing specific functions in several steps. While information is internally processed in a serial fashion, all stages work concurrently to give a higher throughput than if all the steps are completed before starting a next task. Pipelined stages are typically clocked in a synchronous manner wherein a single clock signal controls all the stages. Every stage must therefore complete its work within at least one or more clock periods.

Traditional pipelined memory architectures are often designed to have equally timed stages. As a result, the clock cycle time within a pipelined structure typically differs from a system clock within which the memory functions. Such differences typically result in timing inefficiencies which can result in increased access time.

In order to improve power consumption and speed, asynchronous pipelines have been proposed where all stages proceed independently and do not switch at the same time. Control mechanisms must be used to maintain every pair of adjacent stages in synchronization. The implementation of these control mechanisms is complex and additional circuitry is often required to synchronize the communication of input and output information with external circuitry.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
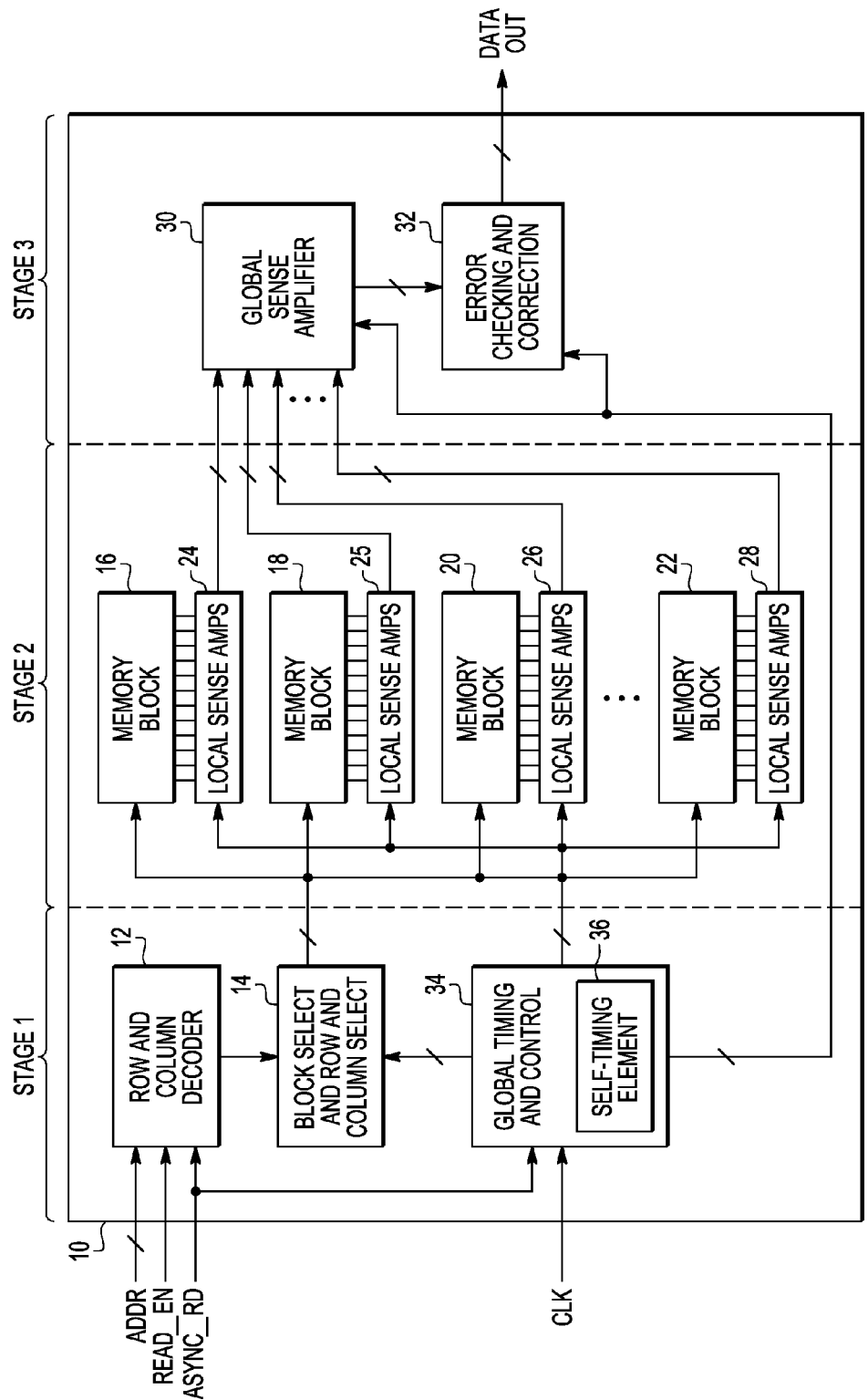
FIG. 1 illustrates in block diagram form a memory circuit in accordance with one form of the present invention.

In one embodiment FIG. 1 illustrates a memory 10 that is pipelined and has three stages labeled "Stage 1", "Stage 2" and "Stage 3". The memory 10 may be implemented as various types of memory circuits. In one form memory 10 is a nonvolatile memory and is a FLASH memory. However, other forms of volatile memory as well as nonvolatile memory may be used. Within Stage 1 is a row and column decoder 12. The row and column decoder 12 has a first input for receiving an address of an accessing sequence corresponding to a demand fetch from a master (not shown). A second input of the row and column decoder 12 receives a read enable signal labeled READ_EN which is provided from a platform interface unit (not shown). In one form the platform interface unit may be implemented as a bus or as a crosspoint switch. A third input of the row and column decoder 12 receives an asynchronous read signal labeled ASYNC_RD from a platform interface unit (not shown). An output of the row and column decoder 12 is connected to an input of a block select and row and column select circuit 14. A second input of the block select and row and column select circuit 14 is connected to a first output of a global timing and control circuit 34. A first input of the global timing and control circuit is connected to the asynchronous read signal, ASYNC_RD. A second input of the global timing and control circuit 34 is connected to a clock signal labeled CLK. The global timing and control circuit 34 has a self-timing element 36.

Within the second stage is a plurality of addressable memory blocks and local sense amplifiers (sense amps). Each of memory blocks 16, 18, 20 and 22 is illustrated to represent a memory array of individual memory storage cells which are aligned in rows and columns. Additional memory blocks are provided as indicated by the additional dots between memory block 20 and memory block 22. For convenience of illustration, only a few of a large plurality of memory blocks are illustrated. Various circuits may be used to implement the memory storage cells. An output of the block select and row and column select circuit 14 is connected to inputs of each of memory block 16, memory block 18, memory block 20 and memory block 22. Also connected to the inputs of memory block 16, memory block 18, memory block 20 and memory block 22 is an output of the global timing and control circuit 34. Local sense amplifiers (sense amps) are connected to respective columns of an array of memory bits within each memory block under the control of the global timing and control circuit 34. In particular, local sense amplifiers 24 each have an input connected to a respective column of memory block 16. Local sense amplifiers 24 also have an input connected to the output of the global timing and control circuit 34. For convenience of illustration, only a small number of inputs to the local sense amplifiers are illustrated for each of the described local sense amplifiers but in reality a much larger number of inputs exist. Local sense amplifiers 25 have a plurality of inputs, each connected to a respective column of memory block 18. Local sense amplifiers 25 also have an input connected to the output of the global timing and control circuit 34. Local sense amplifiers 26 have a plurality of inputs, each connected to a respective column of memory block 20. Local sense amplifiers 26 also have an input connected to the output of the global timing and control circuit 34. Similarly, local sense amplifiers 28 have a plurality of inputs, each connected to a respective column of memory block 22. Local sense amplifiers 28 also have an input connected to the output of the global timing and control circuit 34.

Within the third stage is a global sense amplifier 30. A first input of the global sense amplifier 30 is connected to an output of the local sense amplifiers 24. A second input of the global sense amplifier 30 is connected to an output of the local sense amplifiers 25. A third input of the global sense amplifier 30 is connected to an output of the local sense amplifiers 26. Additional inputs (not shown) of the global sense amplifier 30 are connected to outputs of memory blocks that are in addition to those illustrated in FIG. 2. A fourth, and last illustrated, input of the global sense amplifier 30 is connected to an output of the local sense amplifiers 28. A control input of the global sense amplifier 30 is connected to a second output of the global timing and control circuit 34. An output of the global sense amplifier 30 is connected to an error checking and correction (ECC) circuit 32. An output of the error checking and correction circuit 32 provides output data at a Data Out terminal. For convenience of illustration, only the read portion of memory 10 is illustrated in FIG. 1.

In general, memory 10 is addressed to retrieve data from one of the memory blocks 16, 18, 20 or 22 by receiving an address, ADDR, and provides the data associated with that address at an output terminal. To properly time the operation, the clock signal CLK is used. In order to read data, the asynchronous read signal, ASYNC_RD, must be asserted during a rising edge of the clock signal. The row and column decoder 12 decodes the address and provides a Read decode signal to the block select and row and column select circuit 14. The global timing and control circuit 34 uses both the clock signal and the asynchronous read signal to enable the block select and row and column select circuit 14 to provide a signal that selects a certain one of the memory blocks 16, 18, 20 and 22. The block select and row and column select circuit 14 also provides row and column signals that enables a memory cell at the intersection of an addressed row and column. The appropriate one of the local sense amplifiers 24, 25, 26 and 28 detects that a memory cell in its associated memory block has been addressed and signals the global sense amplifier with a stored data value. The global sense amplifier 30 is monitoring all of the local sense amplifiers 24, 25, 26 and 28 under control of the global timing and control circuit 34. When the global sense amplifier 30 senses the output of one of the local sense amplifiers 24, 25, 26 and 28, output data is provided for error correction to the error checking and correction circuit 32. Any of ECC techniques may be used to check for parity bit errors and a correction is made, if necessary. The described operation takes place, in this exemplary form, as a three stage pipeline. In stage 1 of the pipeline, the address decoding, memory block selection and row and column selection are performed. In stage 2 of the pipeline, the memory blocks 16, 18, 20 and 22 are accessed and local sensing is performed. In stage 3 of the pipeline, the global sensing and ECC function is performed. It should be understood that the physical placement of the circuitry of memory 10 is exemplary and may vary from implementation to implementation. It is generally desired to have operations taking approximately an equal amount of time within each of the stages. Therefore, in order to obtain balanced pipeline stages, the circuit placement may differ from that illustrated in FIG. 1.

Figure 2:
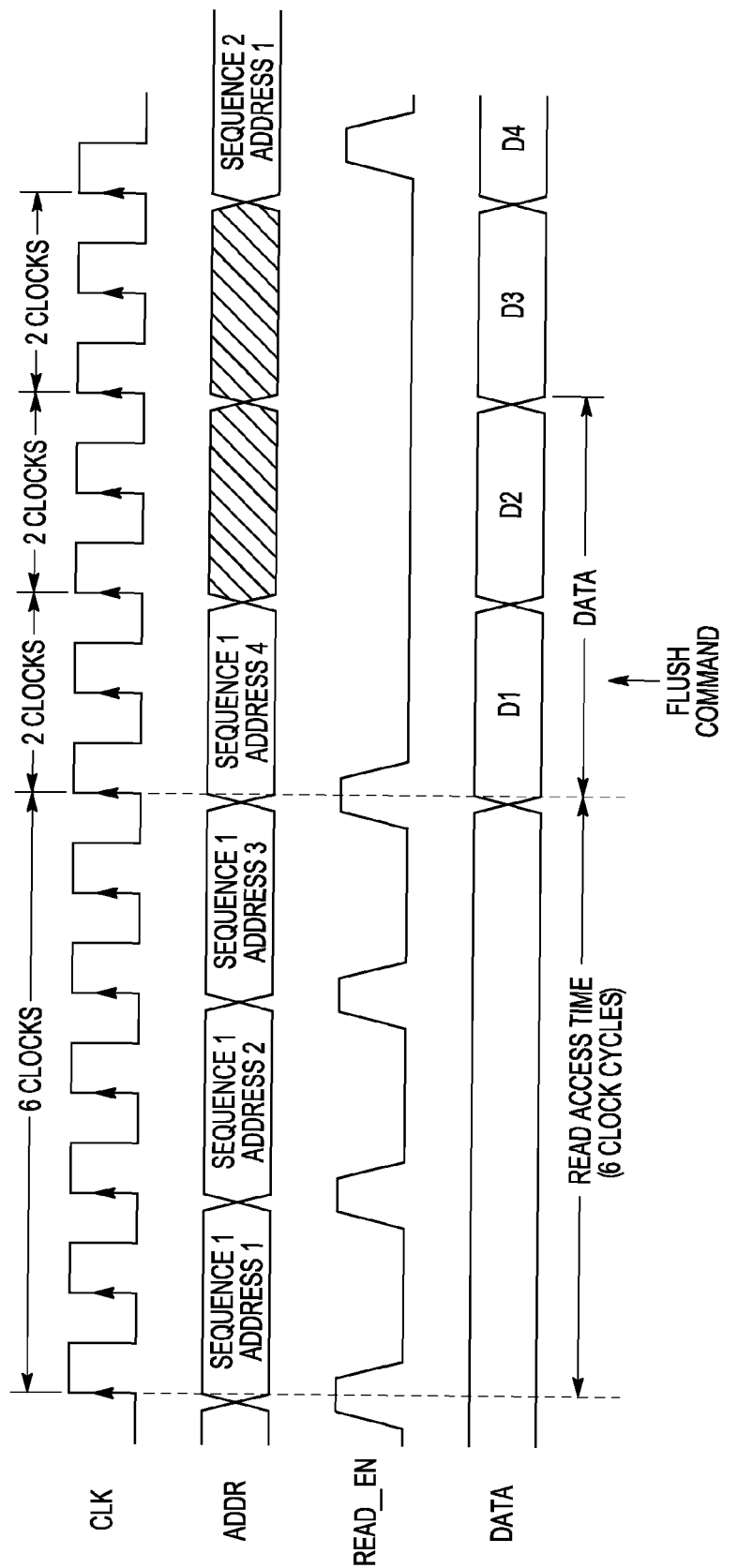
FIG. 2 illustrates in signal diagram form an exemplary form of signals associated with a known synchronous memory.

Illustrated in FIG. 2 is a timing diagram of a conventional three stage pipelined memory that illustrates an exemplary operation of a data processing system having a system clock labeled CLK. A first sequence of addresses is received wherein, in one embodiment, each address is valid for two clock cycles. By way of example the first address sequence contains four addresses. At the beginning of the receipt of each address a read enable signal, READ_EN, is asserted to allow the first stage of the memory to acknowledge the Address 1. In one form the first stage decodes the address. During the third and fourth clock cycles of FIG. 2 a memory array is accessed with the decoded address. During the fifth and six clock cycles the accessed data is sensed and error checking, if any is performed. During the seventh and eighth clock cycles the data D1 associated with address 1 is provided at an output of the memory. Therefore, in one embodiment, the read access time of the three pipelined stage memory is six clock cycles. Shortly after the read access time has completed, a change of flow operation (i.e. a break in sequential accesses forming an access sequence) occurs during a first pair of clock cycles. The change of flow operation is illustrated, for example, in the form of a pipeline flush command. The address, address 4, in the first pipeline stage is permitted to advance through the second and third pipeline stages of the memory in the next two pairs of clock cycles. During the next two pairs of clock cycles the read enable signal, READ_EN, is not asserted to allow the data associated with the Address 4 access to be accessed. At the conclusion of six clock cycles after the read access time, the second sequence of addresses begins. From the beginning clock cycle of the first address of the second sequence, a total of six clock cycles will be required before the first data associated with the first address of the second sequence will be output by the memory. Thus it can be readily seen that the conventional pipelined memory is very inefficient in providing data when a change of flow command is received at the beginning of providing data associated with a read access.

Figure 3:
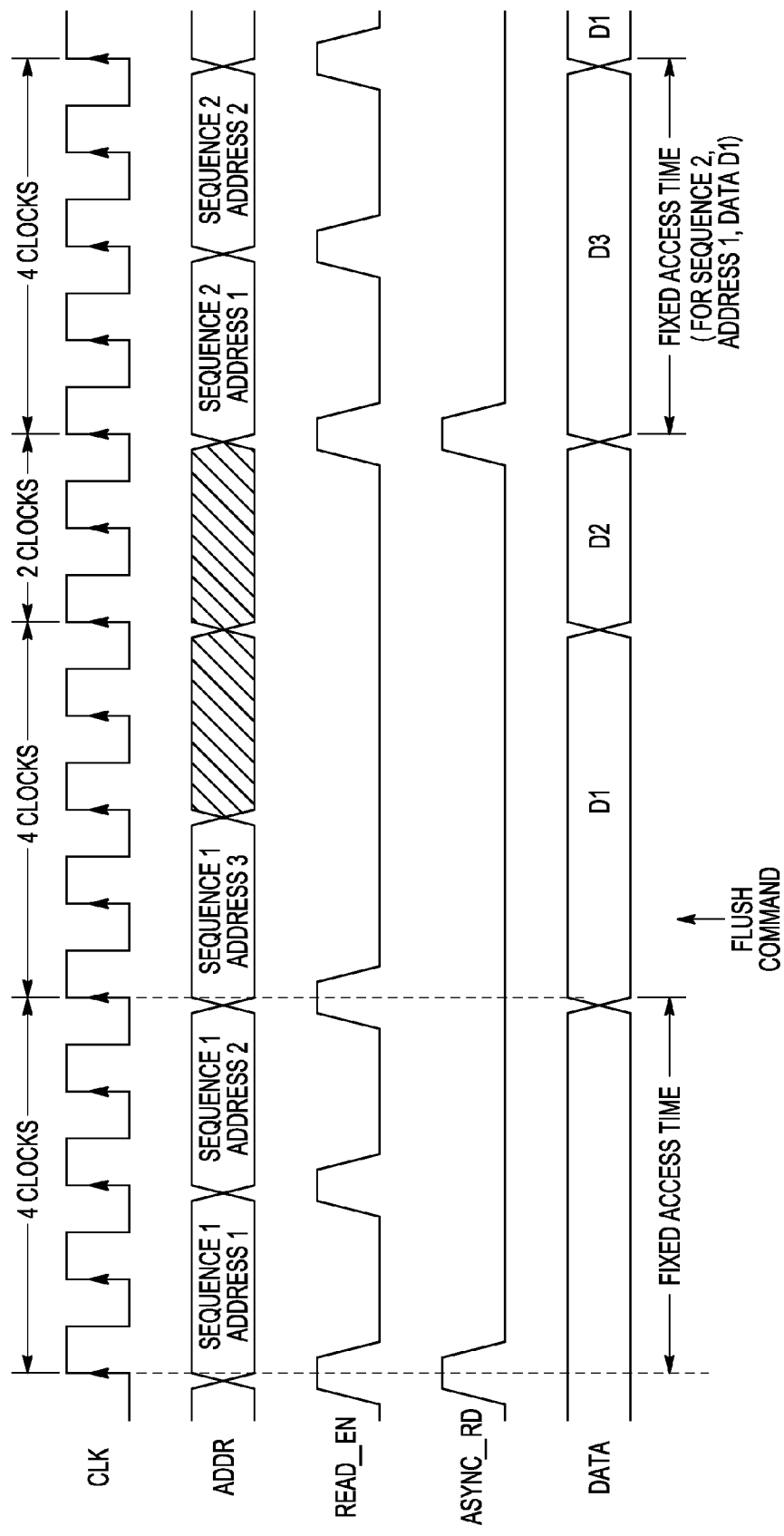
FIG. 3 illustrates in signal diagram form an exemplary form of signals associated with a memory in accordance with the present invention.

Illustrated in FIG. 3 is a timing diagram of the pipelining of the three stage memory 10 of FIG. 1 which significantly improves performance of the conventional pipelined memory by being faster in operation. If a sequence of addresses is characterized by a requesting master as a "demand fetch", an asynchronous read (ASYNC_RD) signal is generated. A demand fetch is a fetch of data that requires execution and without the data a pipeline of the requesting master will stall while it waits for that data. In other words, a demand fetch is a fetch data when a master needs the data. The demand fetch is in contrast to a speculative prefetch which is a prefetch of data which may or may not be executed depending upon whether a change of flow, such as an interrupt or branching operation, occurs before the data is used. In other words, a speculative prefetch is a prefetch of data performed before a master is certain that it needs the data. A speculative prefetch is a predictive prefetch because a prediction as to the need for the data value is being made based upon assumptions in the instruction flow which may or may not occur.

In the exemplary diagram of FIG. 3 a first sequence of addresses contains three addresses. Because the first address in the sequence is a demand fetch, both the read enable signal, READ_EN, and the asynchronous read signal, ASYNC_RD, are asserted at the beginning of the first illustrated clock cycle. In memory 10 of FIG. 1, the ASYNC_RD signal of FIG. 1 is detected by the global timing and control circuit 34 which enables the self-timing element 36 and error checking and correction circuit 32. The self-timing element 36, when activated, functions to self-time each of Stage 1, Stage 2 and Stage 3 independent of the system clock CLK. For example, self-timing element 36 sends a timing signal to the global sense amplifier 30 and error checking and correction circuit 32 to place the circuitry in stage 3 in an asynchronous mode to enable output data. When the first access of the memory blocks in stage two is started, the access ripples through the memory asynchronously to achieve minimum latency. As a result, output data is available after four clock cycles rather than the six clock cycles that the synchronous access took in the FIG. 2 example. The second and remaining accesses of the address sequence are started synchronously after a determined time passes to ensure that the first address access can clear the three stages. The remaining accesses of the address sequence are then handled synchronously in the pipelined memory 10. Thus memory 10 is able to distinguish between an initial access of an access sequence which is implemented as an asynchronous access and subsequent accesses which are synchronous accesses.

Assume in FIG. 3 a similar operating condition as was discussed in connection with FIG. 2. That is, assume that within a very short time after the fixed access time has occurred and during the provision of data D1 that a change of flow is indicated in the form of a Flush Command. The initial asynchronous access significantly shortened the access time of the sequence of addresses and the flush command is illustrated as occurring during the presenting of Address 3 to the row and column decoder 12. No additional addresses in connection with sequence 1 are enabled. The READ_EN signal is not again enabled until two clock cycle pairs have elapsed which ensures enough time lapses for the addresses of the first sequence to clear the pipeline within memory 10. At the time that data D3 associated with the third address is provided, both the READ_EN and ASYNC_RD signals are asserted and Address 1 of a Sequence 2 is presented to the row and column decoder 12. Therefore, the Sequence 2 access is also a demand fetch. Because the first access of Sequence 2 is an asynchronous access, it again only takes four clock cycles or clocks before data D1 associated with Sequence 2 is output. The READ_EN signal is asserted at the rising clock edge of a first clock cycle of each clock cycle pair during the Sequence 2 of addresses.

Because a change of flow or break in a sequential access sequence may occur relatively frequently for certain processing activities, the shorter fixed access time illustrated in FIG. 3 will result in significantly improved performance. In addition to having a shorter interval of access time, a change of flow command may be detected and acknowledged earlier for the pipelined memory 10. The use of an initial asynchronous access and subsequent synchronous accesses results in the time lengths of the data words correlated to a same sequence of addresses being different.

Figure 4:
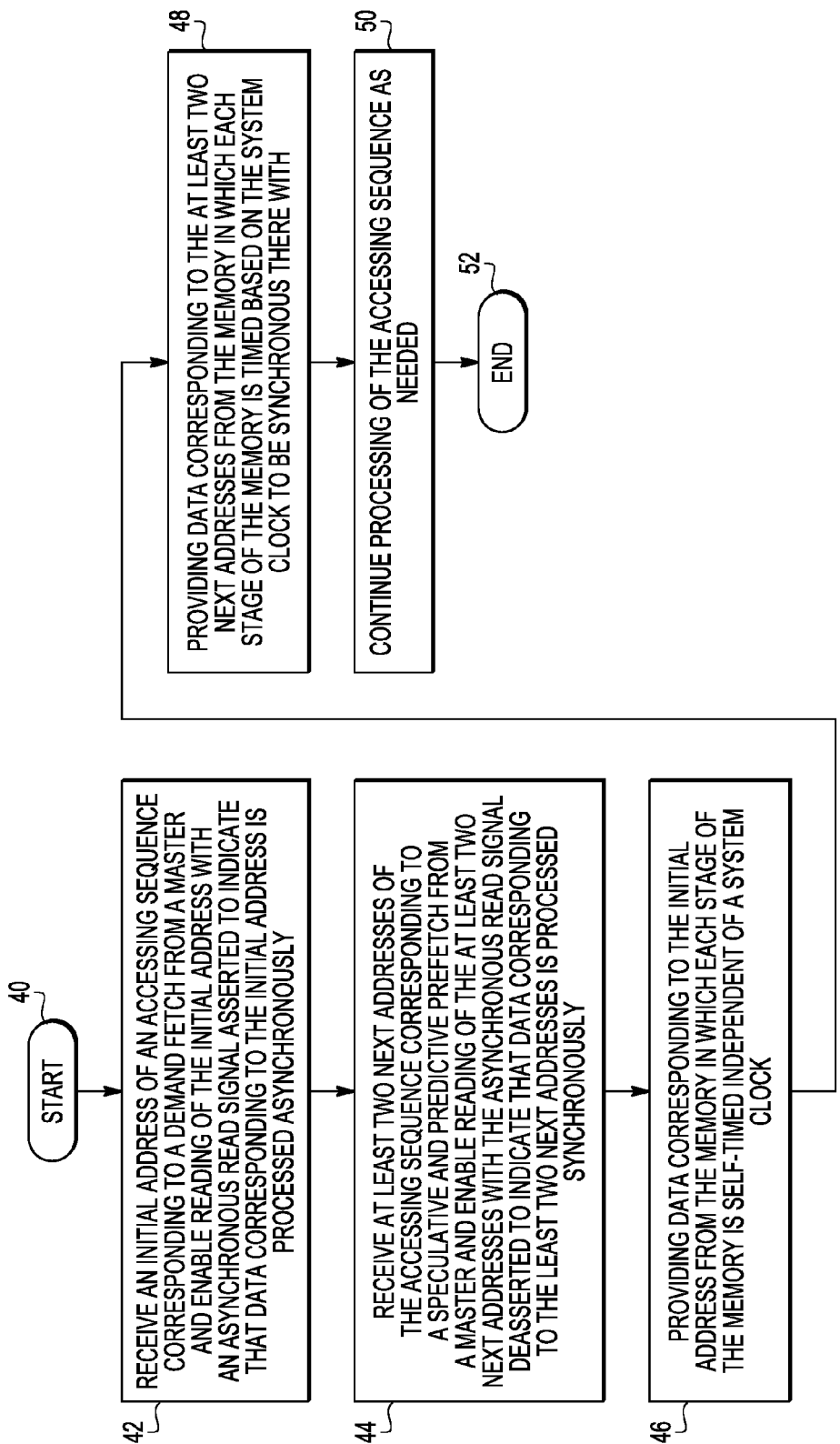
FIG. 4 illustrates in flow chart diagram form an exemplary method of memory operation of the memory circuit of FIG. 1.

Illustrated in FIG. 4 is a flowchart of a method of operation of a multiple access type memory. After a start step 40, a step 42 is performed wherein an initial address of an accessing sequence corresponding to a demand fetch from a master is received. A demand fetch is a fetch that requires execution or a stall of the master's pipeline will if the fetch is not immediately serviced. Reading of the initial address of the accessing sequence is enabled with an asynchronous read signal asserted to indicate that data corresponding to the initial address is processed asynchronously. In a step 44, one or more additional addresses of the accessing sequence are received. In one form at least two next addresses of the accessing sequence are received. The received address or addresses correspond to a speculative and predictive prefetch from a master. Reading of the one or more or the at least two next addresses is enabled with the asynchronous read signal deasserted to indicate that data corresponding to the one or more addresses or the at least two addresses is processed synchronously. In a step 46 data corresponding to the initial address is provided from the memory. Each pipelined stage of the memory is self-timed independent of a system clock. In a step 48, data corresponding to the one or more or the at least two next addresses from the memory is provided. Each pipelined stage of the memory is timed based on the system clock, CLK, to be synchronous therewith. In a step 50, processing of the accessing sequence of addresses continues as needed and specified by program control. Assuming no addresses of a sequential sequence are pending after step 50, end step 52 occurs.

By now it should be appreciated that there has been provided a performance optimized pipelined memory and method of operation. For data processing systems that have a significant amount of randomness or changes of flow in a pipelined memory, the repetition of performing first accesses of address sequences causes a significant performance penalty in synchronous pipelined memories. The first access of a synchronous memory is traditionally inefficient because the operating frequency of a system may be significantly higher than the memory operating frequency. The memory described herein and associated method improves performance of the first access while maintaining a pipeline which improves system performance. It should be noted that the exclusive use of asynchronous reads within a synchronous data processing system is avoided because bands of operating frequency may be created in which the pipeline will work. This limits the system operation to specific frequencies and is undesirable to users.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention. It should be understood that all circuitry described herein may be implemented either in silicon or another semiconductor material. During a manufacture process, the described circuitry may be instantiated by a software code representation of silicon or another semiconductor material.

In one form there is herein provided a method for accessing a memory. A first address is received wherein the first address corresponds to a demand fetch. A second address is received wherein the second address corresponds to a speculative prefetch. First data from the memory is provided in response to the demand fetch, wherein the first data is accessed asynchronous to a system clock. Second data is provided from the memory in response to the speculative prefetch, wherein the second data is accessed synchronous to the system clock. In one form the first address is an initial address of an addressing sequence, and the second address is a subsequent address of the addressing sequence. In another form the first address is fetched as a result of a change of flow operation. In yet another form the memory has a plurality of pipeline stages, and the providing the first data in response to the demand fetch is performed such that each pipeline stage is self-timed independent of the system clock. In another form providing the second data in response to the speculative prefetch is performed such that each pipeline stage is timed based on the system clock to be synchronous with the system clock. In another form a plurality of demand fetches is received and data is accessed asynchronous to the system clock in response to each of the demand fetches. A plurality of speculative prefetches is received and data is accessed synchronous to the system clock in response to each of the speculative prefetches. In another form the first address and the second address are received from a master device coupled to the memory. In yet another form an asynchronous read signal is received when receiving the first address. The asynchronous read signal indicates whether the first address is to be processed asynchronously or synchronously to the system clock. In another form the asynchronous read signal is received when receiving the second address, wherein the asynchronous read signal indicates whether the second address is to be processed asynchronously or synchronously to the system clock.

In yet another form there is provided a method for accessing a memory having a plurality of pipeline stages. An initial address of an accessing sequence is provided, wherein the initial address corresponds to a demand fetch. A next address of the accessing sequence is received, wherein the next address corresponds to a speculative prefetch. Data from the memory is provided in response to the demand fetch, wherein, when data is being provided from the memory in response to the demand fetch, each pipeline stage of the plurality of pipeline stages is self-timed, independent of a system clock. Data from the memory is provided in response to the speculative prefetch, wherein, when data is being provided from the memory in response to the speculative prefetch, each pipeline stage of the plurality of pipeline stages is timed based on the system clock. In another form an asynchronous read signal is received with the initial address, wherein when the asynchronous read signal is received with the initial address, the asynchronous read signal is asserted to indicate that data corresponding to the initial address is to be accessed asynchronously to the system clock. In yet another form the asynchronous read signal is received with the next address, wherein when the asynchronous read signal is received with the next address, the asynchronous read signal is negated to indicate that data corresponding to the next address is to be accessed synchronously to the system clock. In yet another form the initial address is fetched as a result of a change of flow operation. In another form after receiving the next address, a subsequent address of the accessing sequence is received, wherein the subsequent address corresponds to a second speculative prefetch. In another form data from the memory is provided in response to the second speculative prefetch, wherein, when data is being provided from the memory in response to the second speculative prefetch, each pipeline stage of the plurality of pipeline stages is timed based on the system clock.

In another form there is herein provided a memory that has a plurality of pipeline stages. The plurality of pipeline stages receives addresses corresponding to demand fetches and speculative prefetches at an input stage of the plurality of pipeline stages. The plurality of pipeline stages provides data corresponding to each of the demand fetches and speculative prefetches at an output stage of the plurality of pipeline stages. Timing control circuitry is coupled to receive a system clock, wherein, when data corresponding to each of the speculative prefetches is provided, each pipeline stage of the plurality of pipeline stages is timed based on the system clock, and when data corresponding to each of the demand fetches is provided, each pipeline stage of the plurality of pipeline stages is self-timed independent of the system clock.

In another form the timing control circuitry is coupled to receive an asynchronous read signal which indicates whether data corresponding to an address received by the input stage of the plurality of pipeline stages is to be accessed asynchronously or synchronously to the system clock. In yet another form the asynchronous read signal is asserted when an address corresponding to a demand fetch is received by the input stage, and the asynchronous read signal is negated when an address corresponding to a speculative prefetch is received by the input stage. In yet another form the input stage has row and column decoder circuitry and select circuitry coupled to the row and column decoder circuitry. In yet another form the output stage has global sense amplifier circuitry. In yet another form the plurality of pipeline stages includes one or more stages between the input stage and the output stage, wherein the one or more stages includes a plurality of memory blocks, each of the memory blocks coupled to the select circuitry and to corresponding local sense amplifier circuitry. Each of the corresponding local sense amplifier circuitry is coupled to the global sense amplifier circuitry.

Some of the above embodiments, as applicable, may be implemented using a variety of different information processing systems. For example, various semiconductor capacitor structures may be used to implement the described circuitry. The pipelined memory 10 is implemented independent of the type of semiconductor manufacturing process. The decoders and sense amplifiers which provide the described functions may be implemented with various circuit implementations known to provide these functions. The memory array may be implemented with various memory storage circuits that are known.

Although the invention is described herein with reference to specific embodiments, various modifications and changes can be made without departing from the scope of the present invention as set forth in the claims below. Thus, it is to be understood that the circuitry depicted herein is merely exemplary, and that in fact other circuit elements can be implemented which achieve the described functionality. Any arrangement of components to achieve the same functionality is effectively "associated" such that the desired functionality is achieved. Hence, any two components herein combined to achieve a particular functionality can be seen as "associated with" each other such that the desired functionality is achieved. Likewise, any two components so associated can also be viewed as being "operably connected," or "operably coupled," to each other to achieve the desired functionality.

The term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A method for accessing a memory comprising:
   receiving a first address wherein the first address corresponds to a demand fetch;
   receiving a second address wherein the second address corresponds to a speculative prefetch;
   providing first data from the memory in response to the demand fetch, wherein the first data is accessed asynchronous to a system clock;
   providing second data from the memory in response to the speculative prefetch, wherein the second data is accessed synchronous to the system clock;
   receiving an asynchronous read signal when receiving the first address, wherein the asynchronous read signal indicates that the first address is to be processed asynchronously to the system clock in response to the first address corresponding to a demand fetch; and
   receiving the asynchronous read signal when receiving the second address, wherein the asynchronous read signal indicates that the second address is to be processed synchronously to the system clock in response to the second address corresponding to a speculative prefetch.

2. The method of claim 1, wherein the first address is an initial address of an addressing sequence, and the second address is a subsequent address of the addressing sequence.

3. The method of claim 1, wherein the first address is fetched as a result of a change of flow operation.

4. The method of claim 1, wherein the memory has a plurality of pipeline stages, and wherein the providing the first data in response to the demand fetch is performed such that each pipeline stage is self-timed independent of the system clock.

5. The method of claim 4, wherein the providing the second data in response to the speculative prefetch is performed such that each pipeline stage is timed based on the system clock to be synchronous with the system clock.

6. The method of claim 1, further comprising:
receiving a plurality of demand fetches and accessing data asynchronous to the system clock in response to each of the plurality of demand fetches; and
receiving a plurality of speculative prefetches and accessing data synchronous to the system clock in response to each of the plurality of speculative prefetches.

7. The method of claim 1, wherein the first address and the second address are received from a master device coupled to the memory.

8. A method for accessing a memory having a plurality of pipeline stages, the method comprising:
receiving an initial address of an accessing sequence, wherein the initial address corresponds to a demand fetch;
receiving a next address of the accessing sequence, wherein the next address corresponds to a speculative prefetch;
providing data from the memory in response to the demand fetch, wherein, when data is being provided from the memory in response to the demand fetch, each pipeline stage of the plurality of pipeline stages is self-timed, independent of a system clock;
providing data from the memory in response to the speculative prefetch, wherein, when data is being provided from the memory in response to the speculative prefetch, each pipeline stage of the plurality of pipeline stages is timed based on the system clock;
receiving an asynchronous read signal with the initial address, wherein when the asynchronous read signal is received with the initial address, the asynchronous read signal is asserted to indicate that data corresponding to the initial address is to be accessed asynchronously to the system clock in response to the initial address corresponding to a demand fetch; and
receiving the asynchronous read signal with the next address, wherein when the asynchronous read signal is received with the next address, the asynchronous read signal is negated to indicate that data corresponding to the next address is to be accessed synchronously to the system clock in response to the next address corresponding to a speculative prefetch.

9. The method of claim 8, wherein the initial address is fetched as a result of a change of flow operation.

10. The method of claim 8, further comprising:
after the receiving the next address, receiving a subsequent address of the accessing sequence, wherein the subsequent address corresponds to a second speculative prefetch; and
providing data from the memory in response to the second speculative prefetch, wherein, when data is being provided from the memory in response to the second speculative prefetch, each pipeline stage of the plurality of pipeline stages is timed based on the system clock.

11. A memory comprising:
a plurality of pipeline stages, wherein the plurality of pipeline stages receives addresses corresponding to demand fetches and speculative prefetches at an input stage of the plurality of pipeline stages, and wherein the plurality of pipeline stages provides data corresponding to each of the demand fetches and speculative prefetches at an output stage of the plurality of pipeline stages;
timing control circuitry coupled to receive a system clock, wherein, when data corresponding to each of the speculative prefetches is provided, each pipeline stage of the plurality of pipeline stages is timed based on the system clock, and when data corresponding to each of the demand fetches is provided, each pipeline stage of the plurality of pipeline stages is self-timed independent of the system clock;
wherein the timing control circuitry is coupled to receive an asynchronous read signal that indicates whether data corresponding to an address received by the input stage of the plurality of pipeline stages is to be accessed asynchronously or synchronously to the system clock; and
wherein the asynchronous read signal is asserted when an address corresponding to a demand fetch is received by the input stage, and the asynchronous read signal is negated when an address corresponding to a speculative prefetch is received by the input stage.

12. The memory of claim 11, wherein the input stage comprises row and column decoder circuitry, and select circuitry coupled to the row and column decoder circuitry.

13. The memory of claim 12, wherein the output stage comprises global sense amplifier circuitry.

14. The memory of claim 12, wherein the plurality of pipeline stages includes one or more stages between the input stage and the output stage, wherein the one or more stages includes a plurality of memory blocks, each of the plurality of memory blocks coupled to the select circuitry and to corresponding local sense amplifier circuitry, and wherein each of the corresponding local sense amplifier circuitry is coupled to the global sense amplifier circuitry.

* * * * *